(12) United States Patent
Janz

(10) Patent No.: US 6,942,387 B2
(45) Date of Patent: Sep. 13, 2005

(54) PIVOT BEARING INSERT AND BEARING CONSTRUCTED WITH THE SAME

(76) Inventor: Joachim Janz, Am Kraulgarten 4, 85134 Stammham (DE)

( * ) Notice: Subject to any disclaimer, the term of this patent is extended or adjusted under 35 U.S.C. 154(b) by 71 days.

(21) Appl. No.: 10/332,557

(22) PCT Filed: Jul. 9, 2001

(86) PCT No.: PCT/DE01/02458
§ 371 (c)(1),
(2), (4) Date: Jun. 23, 2003

(87) PCT Pub. No.: WO02/04824
PCT Pub. Date: Jan. 17, 2002

(65) Prior Publication Data
US 2004/0086210 A1 May 6, 2004

(30) Foreign Application Priority Data
Jul. 10, 2000 (DE) .......................................... 100 33 487

(51) Int. Cl.⁷ .............................................. F16C 17/00
(52) U.S. Cl. ...................................... 384/129; 384/276
(58) Field of Search .................................. 384/129, 154, 384/226, 248, 249, 251, 275, 276, 280, 281, 295, 296, 416, 424, 428, 438, 905.1; 403/162

(56) References Cited
U.S. PATENT DOCUMENTS 1,220,991 A * 3/1917 McGinley .................... 384/295
2,158,272 A * 5/1939 Chilton ........................ 384/154
3,269,785 A * 8/1966 Lefevre ........................ 384/129
3,710,674 A * 1/1973 Tabor .......................... 403/162
4,174,871 A * 11/1979 Brannan ...................... 384/416
4,383,478 A    5/1983 Jones
4,675,940 A    6/1987 Brockhaus
6,669,370 B1 * 12/2003 Storch et al. ............... 384/129

FOREIGN PATENT DOCUMENTS

| DE | 24 20 264 | 11/1975 |
| DE | 33 38 560 | 4/1985 |
| DE | 36 06 813 | 7/1987 |
| DE | 196 29 377 | 1/1998 |

* cited by examiner

Primary Examiner—Thomas R. Hannon
(74) Attorney, Agent, or Firm—Jordan and Hamburg LLP

(57) ABSTRACT

The invention relates to a pivot bearing insert for a bearing body (1) consisting of two bearing parts (2, 3) which can pivot about a pivot axis (5) and between which the pivot bearing insert (6) is located. The invention is characterized in that the bearing insert consists of two bearing bushes (7) which slide into each other and which are provided with bearing surfaces (9) which slide into each other and outer surfaces which face towards the respective bearing part (2, 3). The bearing surfaces (9) which slide into each other are smooth and free of play, while the outer surfaces are rough and are solidly connected to the respective bearing part (2, 3). A pivot bearing insert (6) of this type is simple to produce and is well protected against wear and tear. The invention also relates to a bearing produced with at least one pivot bearing insert (6) of this type.

16 Claims, 4 Drawing Sheets

Figure 4:
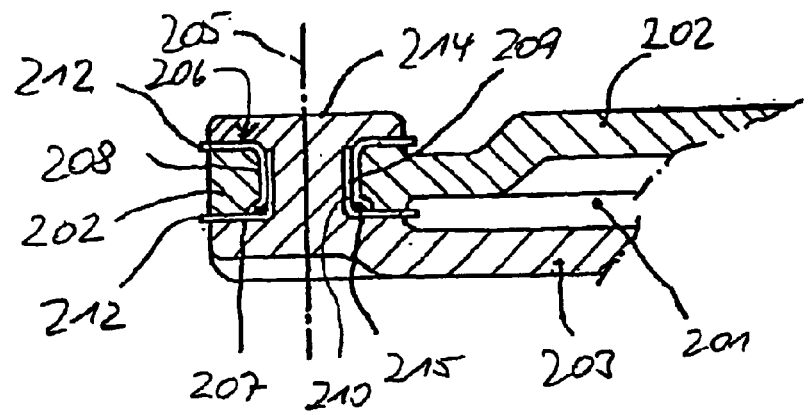

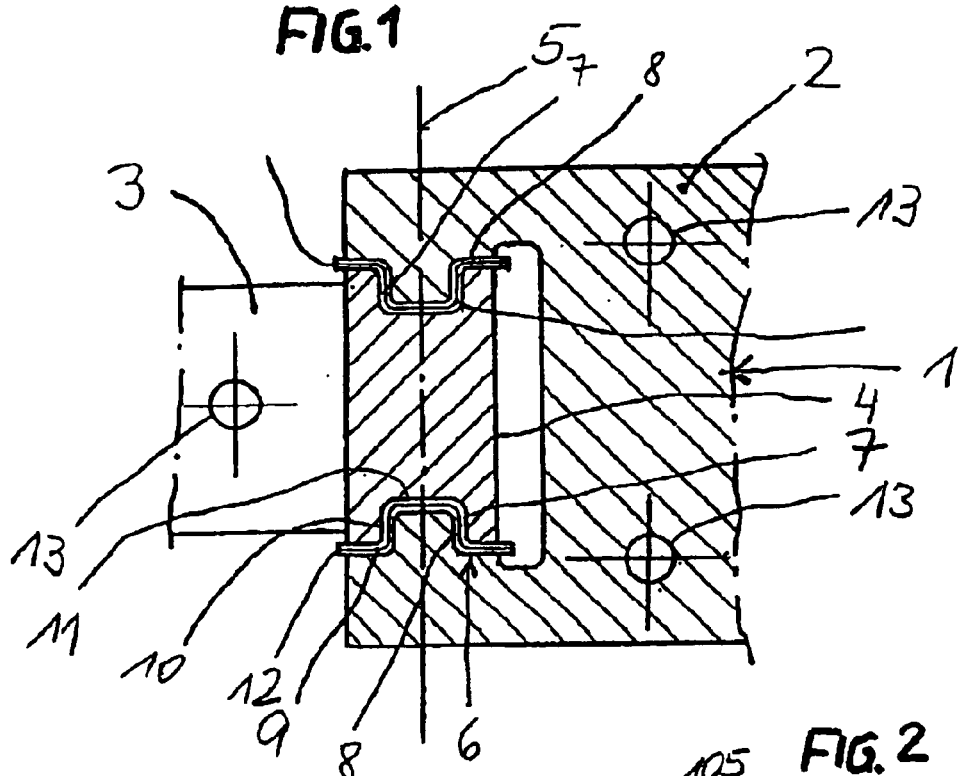
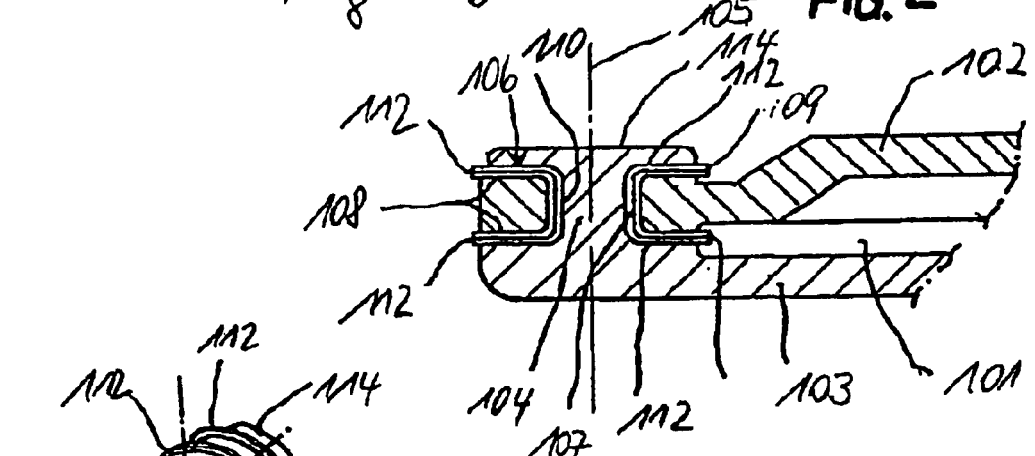
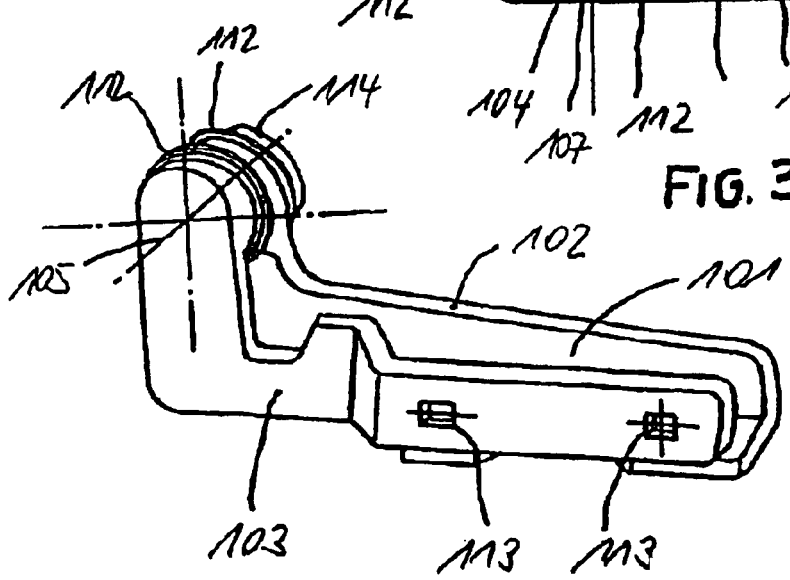

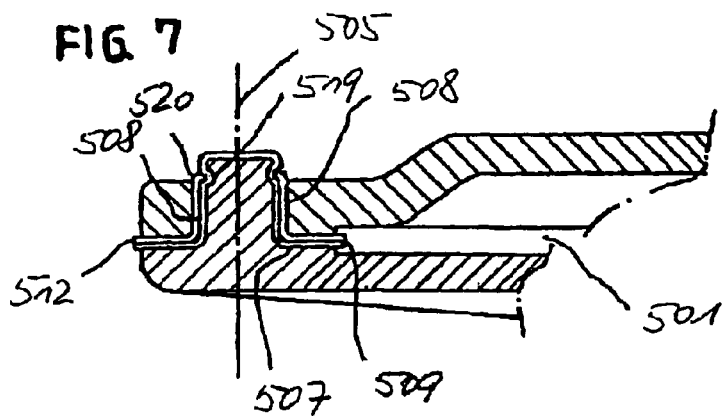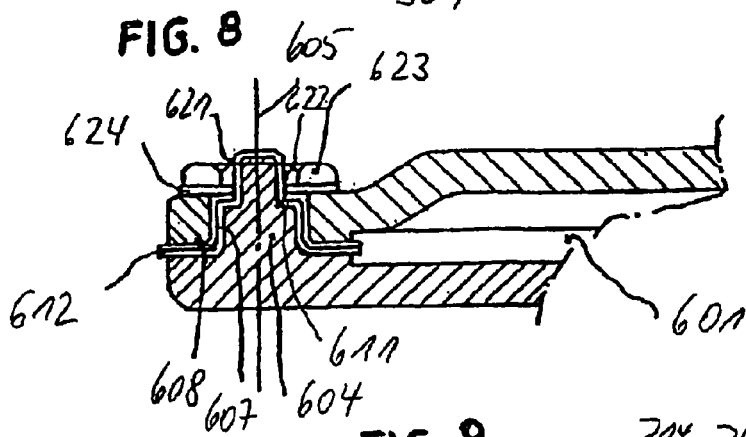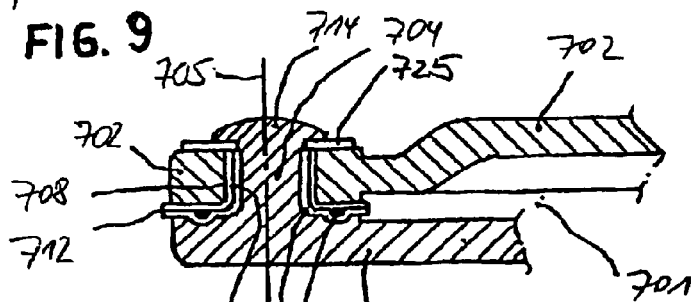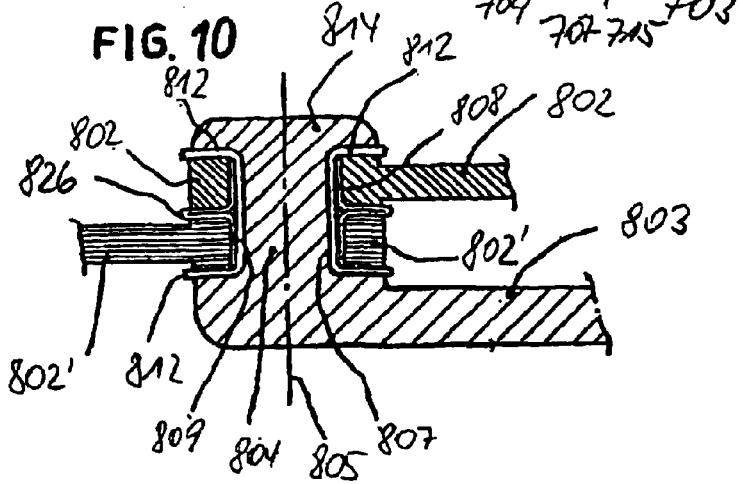

PIVOT BEARING INSERT AND BEARING CONSTRUCTED WITH THE SAME

The invention relates to a pivot bearing insert for a bearing body, which consists of at least two bearing parts, which can be rotated relative to one another about an axis of rotation and between which the insert part for the pivot bearing is disposed The invention furthermore relates to a bearing constructed, constructed with such a pivot bearing insert.

Such inserts for pivot bearings and bearings constructed therewith are known from the DE 196 29 377 C1. The insert has the shape of a hood, which is constructed with a cone and has an edge section, which separates the bearing parts. A liquid metal of the bearing body is cast in a mold around the insert. The insert of the pivot bearing is connected permanently with one of the bearing parts by being shrunk onto this bearing part, as a result of which free shrinkage of the other bearing part takes place simultaneously. In practice, this free shrinkage must take place immediately after the casting process. This means that the bearings, which are still very hot, must be immersed into a cold liquid, so that their temperature is lowered in a shock-like manner for the free shrinkage. This shock-like cooling embrittles the material and distorts the parts. As a result, expensive and cost-intensive heat-treatments must be carried out subsequently. In addition, the necessary clearance between the two bearing parts and between the insert of the pivot bearing and the bearing parts moved relative thereto, resulting from the free shrinkage process, is enlarged after relatively few load changes, because the moving bearing part suffers abrasion relative to the insert of the pivot bearing.

It is an object of the invention to create a pivot bearing insert, which enables a high-grade bearing to be produced with one or more bearing axes, which is relatively inexpensive, can be produced without expensive heat treatments, and shows fewer signs of wear in operation.

To accomplish this object pursuant to the invention, a pivot bearing insert of the type mentioned above is characterized in that it consists of two bearing bushings, which slide one inside the other, are provided with bearing surfaces sliding one inside the other and with outer surfaces facing the respective bearing part, the bearing surfaces, sliding one within the other, being constructed smooth and without clearance, while the outer sides are roughened and permanently connected with the respective bearing part.

The objective is accomplished furthermore with a bearing with a bearing body of at least two bearing parts, which can rotate relative to one another about an axis of rotation, and at least one pivot bearing insert of the aforementioned type.

Pursuant to the invention, the pivot bearing insert consists of two cylindrical bearing bushings, which are assembled without clearance before the bearing body is produced. Preferably, this is accomplished owning to the fact that the two bearing bushings, with their smooth bearing surfaces facing one another, are molded simultaneously, for example, by thermo forming from two-dimensional starting materials. The material of the bearing body, that is, of the bearing parts, which can be rotated relative to one another, is cast around the pivot bearing insert so formed. Because their outsides facing the bearing parts are roughened, the two bearing bushings are firmly connected with one another. After cooling, the adhesion friction between the bearing bushings is overcome and easily sliding bearing surfaces result, which make an easily sliding bearing movement possible.

In a preferred embodiment of the pivot bearing insert, the bearing bushings, sliding one within the other, have a peripheral edge, perpendicular to the axis of rotation, at least at one end. Moreover, the edges can slide on one another or be disposed spaced apart and parallel to one another. Furthermore, it is possible that at least one and preferably, however, both of the bearing bushings, sliding one inside the other, have a peripheral edge at both ends.

The bearing surfaces basically may extend conically. Preferably, however, there are cylindrical circumferential surfaces.

The two bearing bushings, sliding one inside the other, may be constructed from the same material, in which case, however, they have been subjected preferably to different surface treatment. However, a construction of the bearing bushings, sliding within one another, from different materials is preferred. In this case, the outer bushing preferably consists of stainless steel and the inner bushing of copper, brass or bronze.

The two bearing bushings, sliding one within the other, may be provided with radially extending sections and can then be pressed adjustably against one another in the axial direction. By these means, the degree of binding of the bearing can be adjusted. Embodiments in this connection are explained in greater detail below by means of diagrammatic representations.

The bearing, constructed with an inventive pivot bearing insert, can be constructed so that it can be dismantled and reassembled. For this purpose, for example, an inner bearing bushing can be constructed hat-shaped and, at its closed end parallel to this end, have a peripheral, inwardly shaped groove, into which a retaining washer for fixing the outer bearing bushing can be inserted. At the same time, the bearing can easily be dismantled non-destructively by removing the retaining washer.

For producing long-term lubrication, it is appropriate to construct, in at least one of the surfaces of the two bearing bushings, sliding in contact with one another, a peripheral space for accommodating long-term lubrication, for example, in the form of a lubricating grease.

The inventive bearing, which is provided with at least one pivot bearing insert that has been described, preferably is constructed as a casting, for which the pivot bearing insert is cast into the bearing body.

At the same time, one of the bearing parts can extend through the inner bearing bushing and form a concluding flange, holding the bearing together.

The bearing part, which extends into the inner bearing bushing or through the inner bearing bushing, then forms part of an axle.

The inventive bearing can also have a separate axle part, with which at least two pivot bearing inserts are connected. These pivot bearing inserts preferably are identical and can be disposed, spaced apart, either transposed parallel to one another or disposed symmetrically in mirror image fashion.

Figure 5:
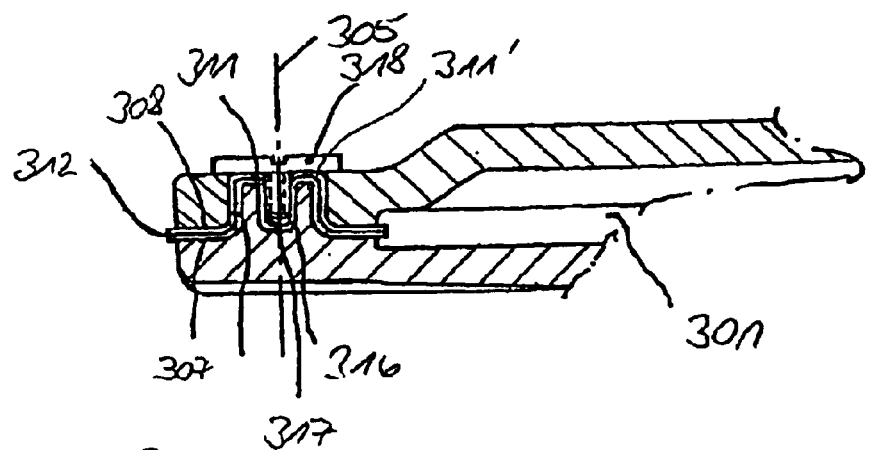
Figure 6:
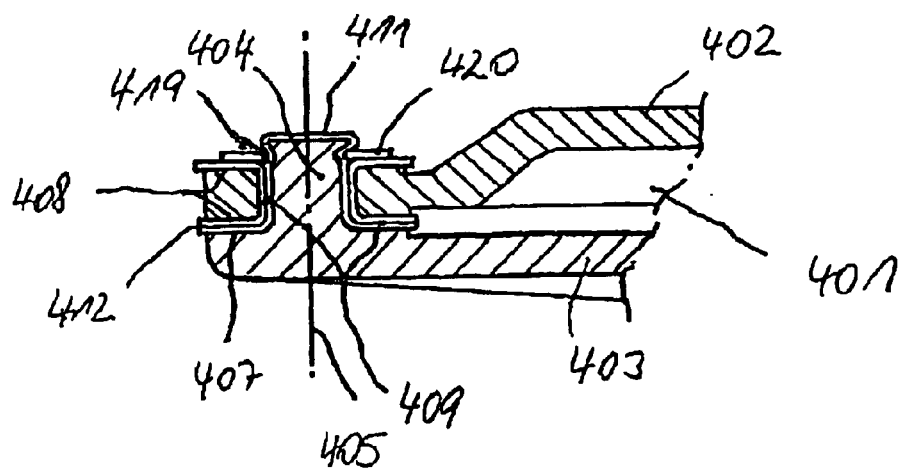
Figure 11:
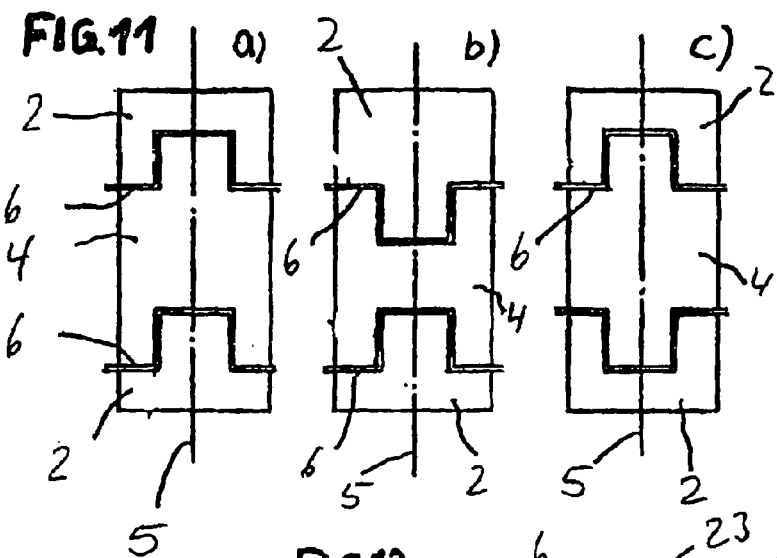
Figure 12:
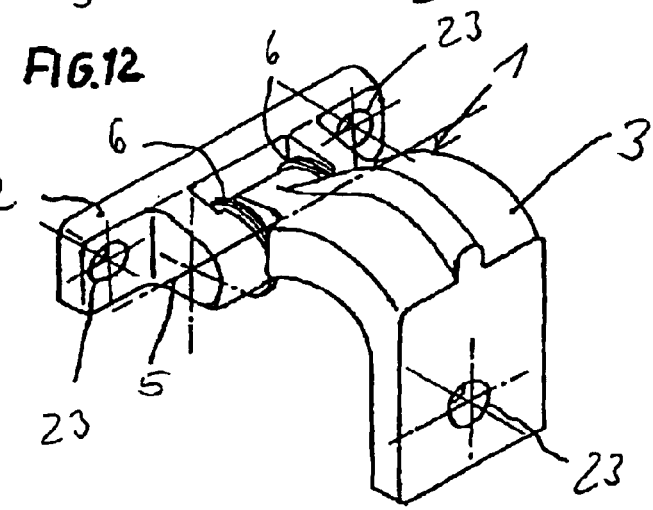
Figure 13:
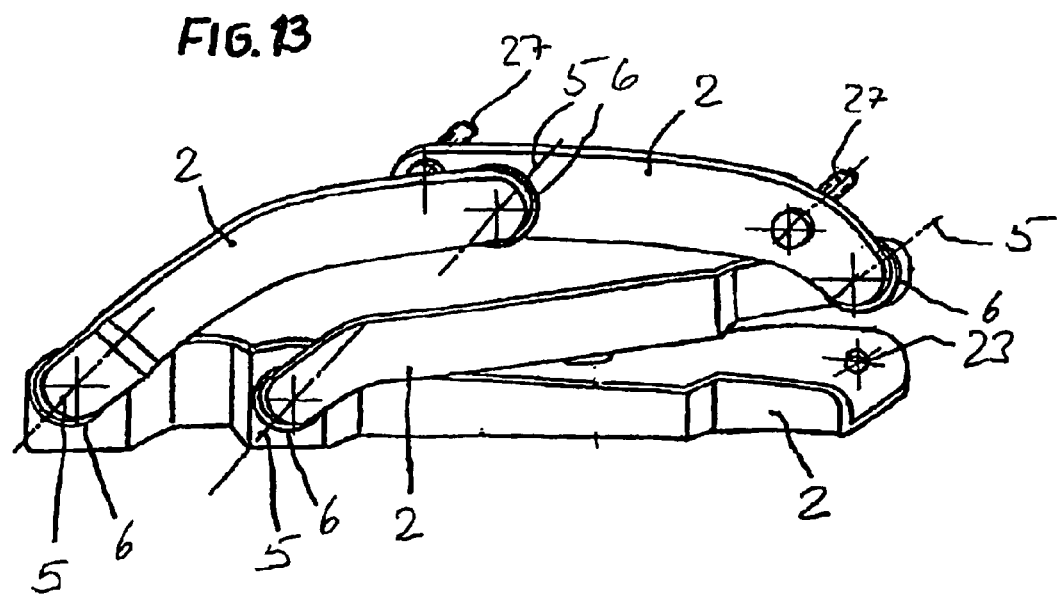

The invention is to be described in greater detail in the following by means of examples, which are shown in the drawing, in which FIG. 1 shows a diagrammatic representation of an embodiment of an inventive bearing with two inventive pivot bearing inserts in a sectional representation, FIG. 2 shows a sectional representation of a second embodiment of an inventive bearing, constructed as a hinge, FIG. 3 shows a perspective view of the embodiment of FIG. 2, FIG. 4 shows a third embodiment of an inventive bearing, FIG. 5 shows a fourth embodiment of an inventive bearing, for which the axial contacting pressure can be adjusted, FIG. 6 shows a fifth embodiment of an inventive bearing, which can be dismantled, FIG. 7 shows a sixth embodiment of an inventive bearing, FIG. 8 shows a seventh embodiment of an inventive bearing with the possibility of adjusting the axle contacting pressure, FIG. 9 shows an eighth embodiment of an inventive bearing, FIG. 10 shows a ninth embodiment of an inventive bearing, FIG. 11a to c show variations of the arrangement of two inventive pivotal bearing inserts at an axle part, FIG. 12 shows an application example for the arrangements of FIG. 11 and FIG. 13 shows a diagrammatic view of a fourfold bearing.

The bearing, shown in FIG. 1, has a bearing body 1 (alternatively labeled 201, 301, 501 and 701) with a first bearing part 2 (alternatively labeled 402) and secondary part 3. The first bearing part 2 is a supporting bearing part, while the secondary bearing 3 is supported over an axle piece 4. The axial piece 4 is mounted so that it can rotate about a bearing axle 5 (alternatively labeled 405, 505, 605 and 805). For this purpose, two jointly shaped bearing sleeves 7, 8 (alternatively labeled 508), forming a pivot bearing insert 6, are inserted between the first bearing part 2 and the axial piece 4 of the second bearing part 3. The bearing sleeve 7, 8 are hat-shaped. Between them, a bearing surface 9 (alternatively labeled 409, 509, and 809) is formed, on which the two bearing bushings slide against one another.

The bearing bushings 7, 8 form a cylindrical surface 10, which is closed at one end by a cylinder bottom 11 and, at its other end, has a peripheral edge 12 (alternatively labeled 312, 612 and 812), which is directed to the outside and protrudes somewhat beyond the contour of the first bearing part 2 or of the axle piece 4 of the second bearing part 3. In the example shown in FIG. 1, the bearing surface 9 extends over the whole contour of the whole bearing bushings 7, 8, since these are constructed identically and are in sliding contact with one another over the whole contour, when the axle piece 4 of the second bearing part 3 is rotated relatively to the first bearing part 2.

The bearing body 1 shown is prepared in a single casting process in that the pivot bearing inserts 6 are placed in the mold and surrounded with the liquid metal of the bearing parts 2 and 3. Openings 13, which are to be provided in the bearing parts 2, 3, are molded in this casting process.

For the second example, shown in FIGS. 2 and 3, a bearing body 101 is constructed in the form of a hinge for an engine hood, a tailgate for a passenger car, etc. A first bearing part 102 and a second bearing part 103 are connected together over a pivot bearing insert 106, which consists of two bearing bushings 107, 108, between which a bearing surface is formed 109. The bearing bushings 107, 108, consist of a cylindrical surface and of radially directed peripheral edges 112 at both axial ends of the cylindrical surface 110.

The second bearing part 103 passes with a section forming an axle piece 104 through the inner bearing bushing 107 and terminates, on the other side, with an end flange 114 (alternatively labeled 814), the diameter of which is clearly larger than the internal diameter of the inner bearing bushing 107, so that there is a connection, which can no longer be dismantled, between the bearing parts 102, 103.

FIG. 3 illustrates that, here also, the openings 113 are molded during the casting process. In this example, the bearing bushing 108, which is on the outside with respect to the axis of rotation 105, is connected over the roughened surface permanently with the first bearing part 102, and the bearing bushing 107, which is on the inside with respect to the axis of rotation 105, is connected permanently with the second bearing part 103.

The third example, shown in FIG. 4, represents a bearing similar to that of the second example. Here also, the two bearing parts 202 and 203 are held together by the second bearing part 203, which passes on the inside through the pivot bearing insert 206 and has the end flange 214.

In this case, the pivot bearing insert consists of a bearing bushing 207 and a bearing bushing 208, which are inner and outer with respect to the axis of rotation 205 and are both constructed with a cylindrical surface 210 and with a radial edge 212, which is at right angles to the axis of rotation 205. In other words, the bearing bushings 207 and 208 are constructed L-shaped in cross-section. The two edges 212 are at different ends, so that, together, they embrace a ring-shaped section of the first bearing part 202. The cylindrical section 210 of the outer bearing bushing 208 is not retracted with the end, which is provided with the edge 212, in the form of a bead and accordingly forms a space 215 for lubricating grease in order to realize long-term lubrication of the bearing surface 209 between the two bearing bushings 207, 208.

In the case of the fourth example, shown in FIG. 5, a bearing bushing 307, which is internal with respect to the axis of rotation 305, essentially is constructed hat-shaped. However, a cylindrical bottom 311 of the internal bearing bushing 307, centrally to the axis of rotation 305, has a cylindrical retraction 316, which is provided with an internal thread 317 and, accordingly, can accommodate a screw 318 with a corresponding externally threaded bolt. The cylindrical bottom 311' of the external bearing bushing 308 is provided with an opening, which permits passage of the threaded bolt of the screw 318, so that, by means of the screw 318, an axial contacting pressure can be generated between the bearing bushings 307, 308. The head of the screw 318 furthermore serves to hold the bearing together.

In the case of the fifth example, shown in FIG. 6, the bearing body 401 is once again constructed similarly to that of the preceding examples. To ensure that the bearing can be dismantled, a section 404 of the axle of the second bearing part 403 protrudes into an inner bearing bushing 407, which, without an increase in diameter, is closed off with a cylinder bottom 411. As in the example of FIG. 2, the outer bushing of 408 is constructed with peripheral edges 412 at both ends. The end of the inner bearing bushing 407, protruding axially from the outer bearing bushing 408, is provided parallel to the cylinder bottom 411 with a peripheral, inwardly retracted groove 419, in which a retaining ring 420 is snapped in order to hold the bearing together. The bearing can readily be dismantled by removing the retaining ring 420.

For the sixth embodiment shown in FIG. 7, the inner bearing bushing 507 is constructed as in FIG. 6. On the other hand, the outer bearing bushing 508 has a peripheral edge 512 only at one end and, at the other end, is provided with an annular shoulder 520, which is directed radially inward and protrudes into the groove 519. For this reason, the bearing of this construction can no longer be dismantled non-destructively.

For the seventh embodiment of an identical bearing body 601, shown in FIG. 8, the outer bearing bushing 608 is constructed similarly to the outer bearing bushing 308, shown in FIG. 5. On the other hand, the inner bearing bushing 607 has a renewed hat-shape 621, which is placed on the cylinder bottom 611 and is provided at the cylindrical surface with an external thread 622, so that a nut 623 can be screwed with a washer 624 onto this hat-shape 621. As a result, the bearing is held together and the two bearing bushings 607, 608 can be pressed axially against one another in order to adjust the resistance to rotation. The axle piece 604, resulting from the inner contour of the inner bearing bushing 607, is constructed step-shaped and cylindrically.

For the eight embodiment shown in FIG. 9, the material of the second bearing part 703 has flown through an inner bearing bushing 707 and, with its axle piece 704, forms a mushroom-shaped end flange 714, which is rotationally symmetrical to the axis of the rotation 705. The end flange 714 is separated by an annular disk 725 from the material of the first bearing part 702.

The two bearing bushings 707 and 708 are constructed L-shaped and are parallel to one another. Accordingly, an L-shaped bearing surface 709 is formed between the two bearing bushings 707, 708.

In the region of the peripheral edge 712, the inner bearing bushing 707 is provided with a peripheral groove for forming a closed-off space 715 for holding lubricating grease in order to realize permanent lubrication.

The ninth embodiment, shown in FIG. 10, shows that a second bearing part 803 can also be mounted at two first bearing parts 802, 802', in that an axle piece 804 of the second bearing part 803 is connected with an inner bearing bushing 807, while the two (stationary) first bearing part 802, 802' are connected with an outer bearing bushing 808, which, at half the axial height, has a radial, peripheral web 826, which is formed by doubling the material.

FIG. 11 diagrammatically illustrates the possibility of disposing two pivot bearing inserts 6 between an axle piece 4 and a bearing part 2, in order to realize a rotation about an axis of rotation 5.

According to FIG. 11a, the two pivot bearing inserts 6 are shifted in parallel on the axis of rotation.

According to FIG. 11b, the two pivot bearing inserts 6 are constructed hat-shaped and directed with their closed ends towards on another.

According to FIG. 11c, the closed ends of the two pivot bearing inserts 6 are directed away from one another.

FIG. 12 illustrates a use of the first example for a hinge for an automobile. The bearing body 1 consists of a supporting first bearing part 2 and a supported second bearing part 3. The supported bearing part 3 can be rotated about an axis of rotation 5 relative to the first bearing part 2. For this purpose, the pivot bearing inserts 6 are provided. The view illustrates the fastening opening 23, which are molded during the casting process.

FIG. 13 illustrates a complex bearing body with four axes of rotation 5 and movable bearing parts 2.

The openings 23, which were produced in the casting process and for which fastening screws 27 are drawn, can also be recognized. The complete bearing, with the pivot bearing inserts 6, the fastening screws 27 and the fastening holds 23 can be produced in one operation, without clearance, rotatably and with automatic lubrication.

What is claimed is:

1. A combination comprising a bearing body and a bearing insert for the bearing body, the bearing body comprising at least two bearing parts which are rotatable relative to one another about an axis of rotation and between which the pivot bearing insert is disposed, wherein the pivot bearing insert comprises two bearing bushings which slide one inside the other and are provided with bearing surfaces which slide one inside the other and with external sides facing the respective bearing parts, the bearing surfaces which slide one inside the other being constructed smoothly and without clearance, whereas the external sides have been roughened and are permanently connected with the respective bearing parts.

2. The combination of claim 1, wherein the bearing bushings, which slide one inside the other, have, at least at one end, an edge which is perpendicular to the axis of rotation.

3. The combination of claim 2, wherein the edges of the two bearing bushings which slide one inside the other also rotate parallel to one another.

4. The combination of claim 2, wherein the two bearing bushings which slide one inside the other each have at one end a respective said peripheral edge, both edges extending parallel to one another.

5. The combination of claim 1 or 2, wherein an end face of at least one of the bearing bushings is closed and the other end is formed as a flange.

6. The combination of claim 5, wherein the two bearing bushings which slide one inside the other have radially extending sections and can adjustably be pressed against one another axially.

7. The combination of claim 5, wherein the bearing bushing which has a closed end and a flange comprises an inner bearing bushing and has a peripheral, inwardly formed groove which is parallel to said closed end and into which a retaining ring is received for fixing the other bearing bushing, the other bearing bushing comprising an outer bearing bushing.

8. The combination of claim 1 or 2, wherein the bearing surfaces are cylindrical.

9. The combination of claim 1 or 2, wherein the two bearing bushings which slide one inside the other are each comprised of a material different from the other.

10. The combination of claim 1 or 2, wherein, in the bearing surface of at least one of the two bearing bushings a peripheral space is formed to accommodate long-term lubrication.

11. A bearing comprising the combination of claim 1 or 2.

12. The bearing of claim 11, wherein the bearing part insert is cast in the bearing body.

13. The bearing of claim 11 wherein one of the bearing parts extends through the inner bearing bushing and comprises a flange at a distal end thereof.

14. The bearing of claim 13, wherein the bearing which extends through the inner bearing bushing comprises an axle.

15. The bearing of claim 11, further comprising an axle, at least two of said pivot bearing inserts being mounted on the axle.

16. The bearing of claim 11, further comprising means for facilitating disassembly and reassembly of the bearing.

* * * * *